United States Patent [19]

Harris, III

[11] Patent Number: 4,903,922
[45] Date of Patent: Feb. 27, 1990

[54] HOSE HOLDING FIXTURE

[76] Inventor: John H. Harris, III, 4518 Sehoy Cir., Pensacola, Fla. 32504

[21] Appl. No.: 264,372

[22] Filed: Oct. 31, 1988

[51] Int. Cl.4 ............................................. A62C 23/04
[52] U.S. Cl. ..................................... 248/75; 248/301
[58] Field of Search ..................... 248/75, 74.1, 311.2, 248/79, 229, 215, 301, 304, 364, 340

[56] References Cited

U.S. PATENT DOCUMENTS

| | | | |
|---|---|---|---|
| 1,112,744 | 10/1914 | Weh | 248/311.2 X |
| 1,175,454 | 3/1916 | Keller | 248/79 |
| 2,453,248 | 11/1948 | Much | 248/75 |
| 2,966,320 | 12/1960 | Schoepe et al. | 248/75 |
| 3,119,587 | 10/1962 | Anderson . | |
| 3,154,276 | 10/1964 | Havener | 248/229 |
| 3,667,712 | 7/1970 | Furgueson . | |
| 3,880,280 | 4/1975 | Fyvolent | 248/364 X |
| 4,027,842 | 6/1977 | Mittleman | 248/75 |
| 4,429,848 | 2/1984 | Gunsolus | 248/75 |
| 4,440,370 | 4/1984 | Rood | 248/75 |
| 4,715,402 | 12/1987 | Staun et al. | 248/75 X |

FOREIGN PATENT DOCUMENTS 1443 of 1895 United Kingdom ............... 248/340

Primary Examiner—Alvin C. Chin-Shue
Attorney, Agent, or Firm—Pearne, Gordon, McCoy & Granger

[57] ABSTRACT

Hose holding fixtures for supporting all or part of a water or garden hose connected to a faucet. The fixtures are usually connected to the hose adjacent to the faucet and provide supports for releasably holding the free end of the hose and/or hose accessories such as nozzles or sprinklers. Some illustrated embodiments provide elongated strap portions which extend through a coiled hose and releasably hook over the faucet to support a coiled hose from the faucet.

14 Claims, 5 Drawing Sheets

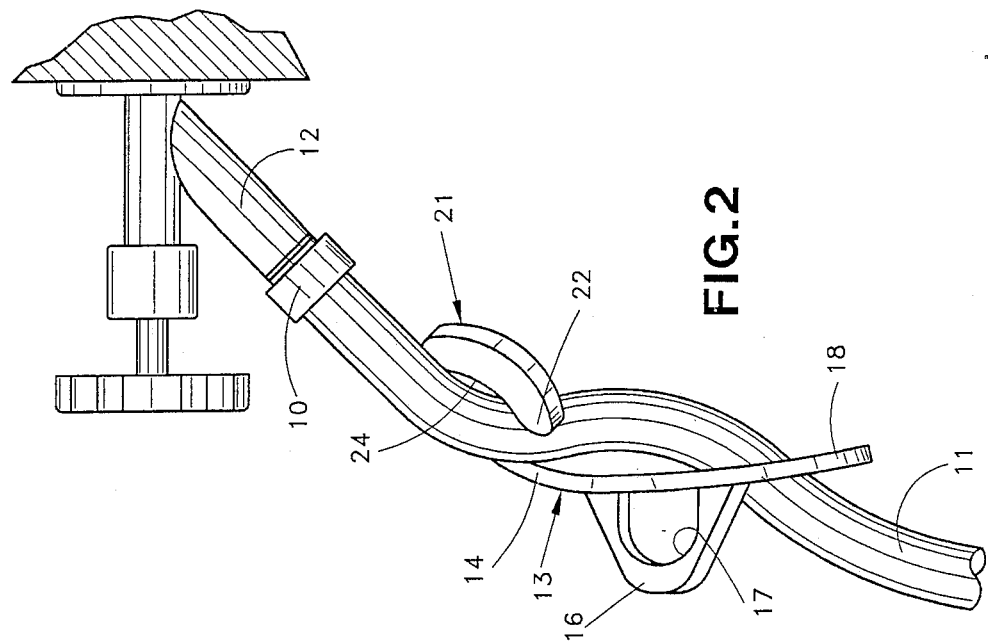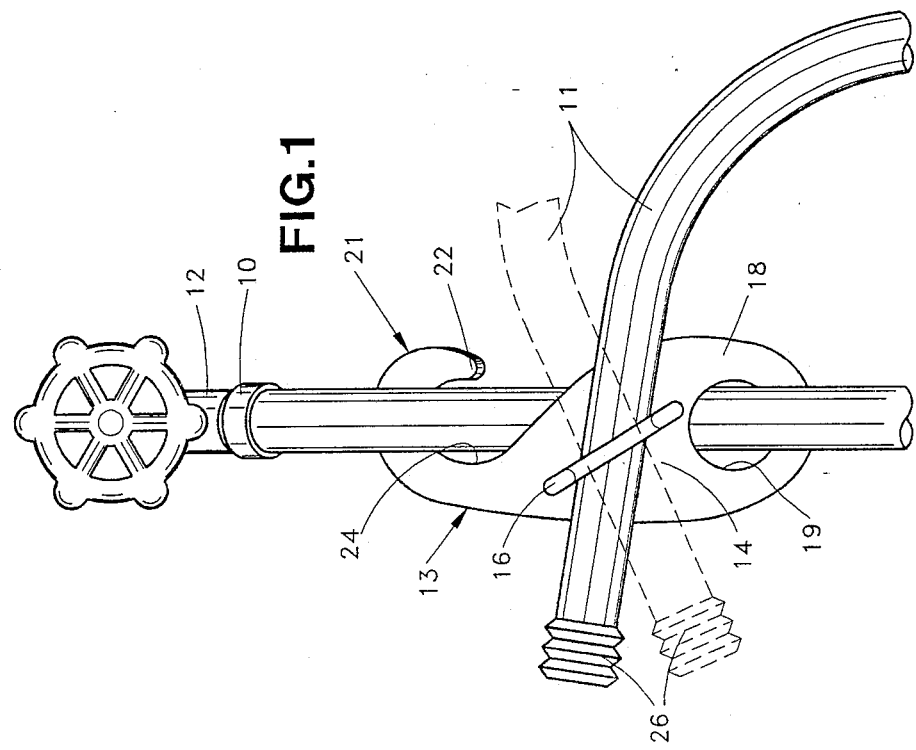

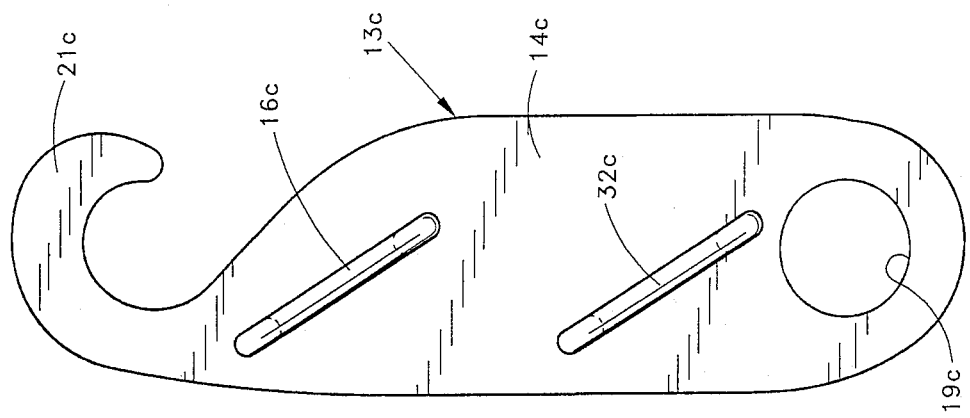
FIG.7
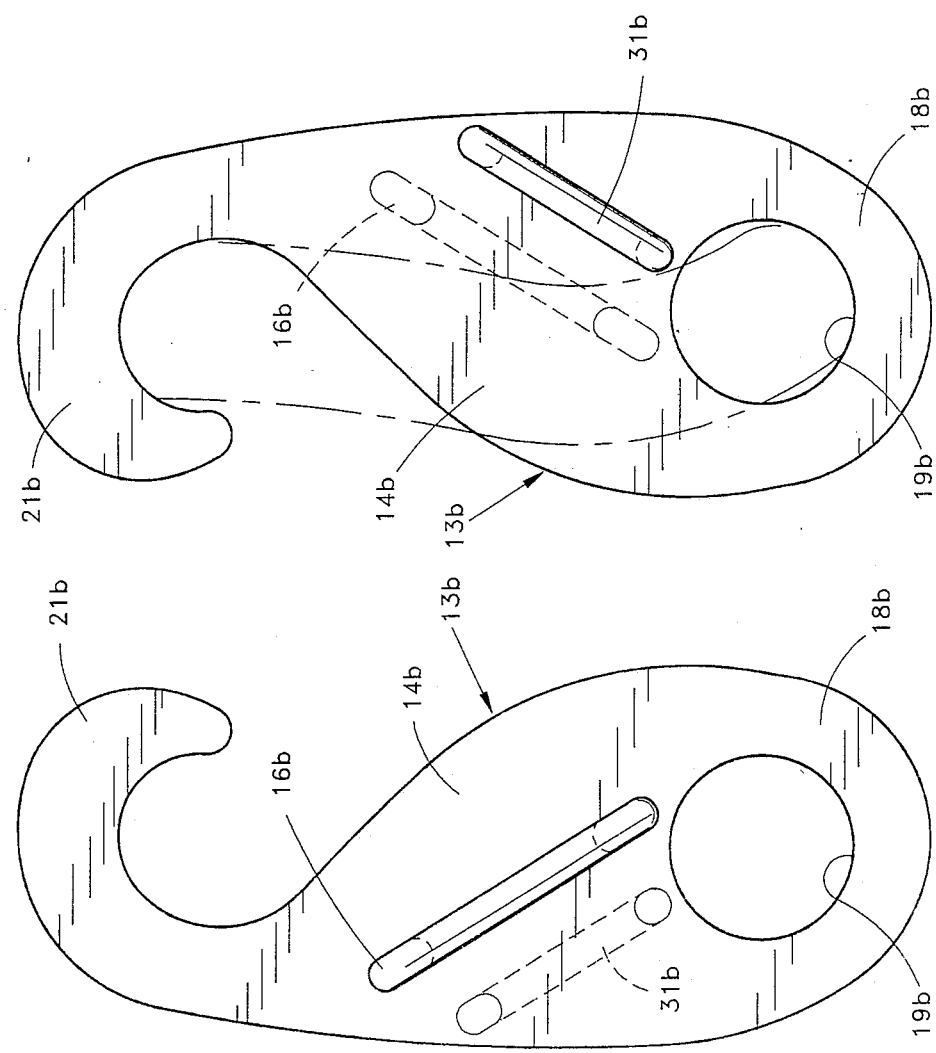
FIG.6b
FIG.6a

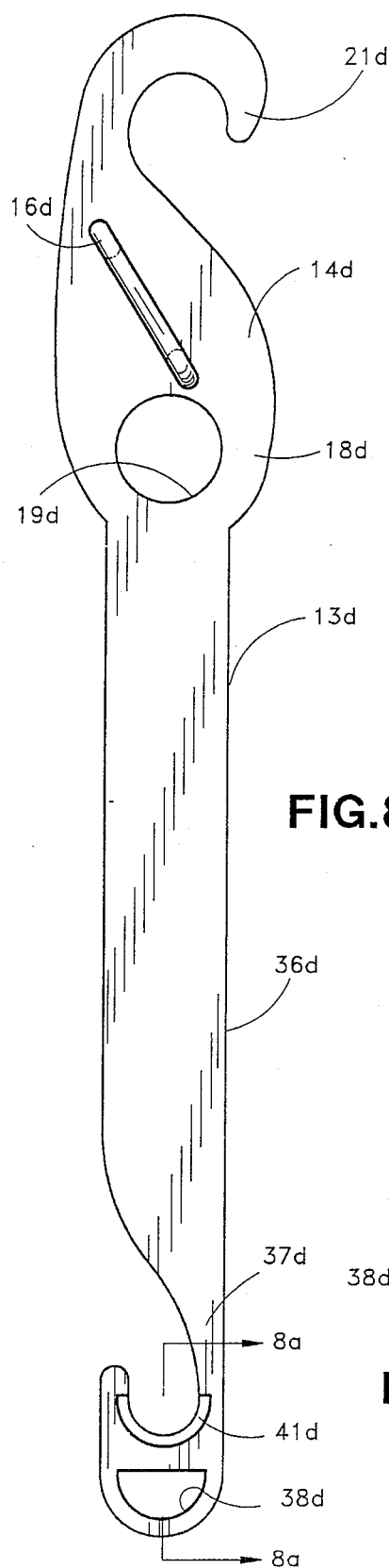
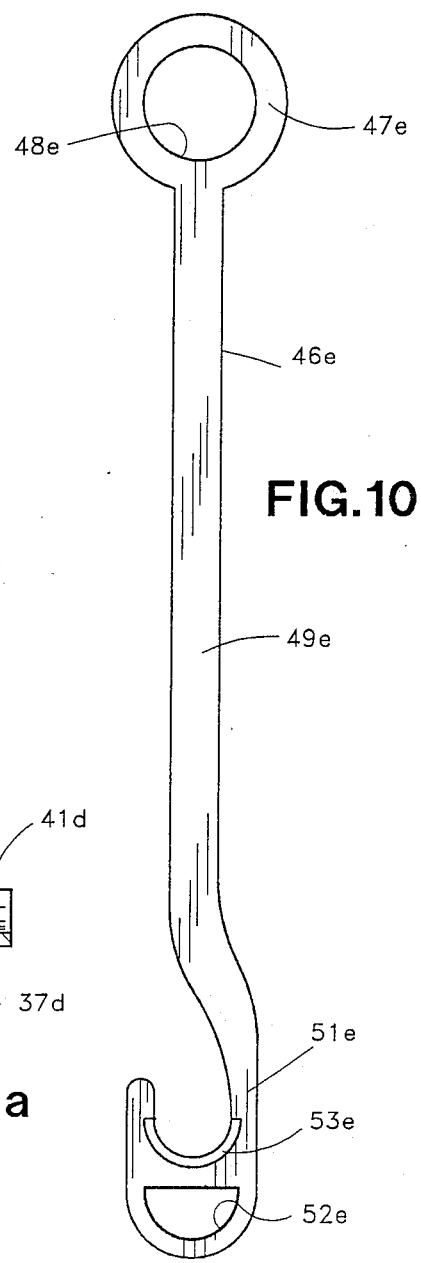
FIG. 8
FIG. 8a
FIG. 10

HOSE HOLDING FIXTURE

BACKGROUND OF THE INVENTION

This invention relates generally to fixtures for supporting hose and the like, and more particularly to a novel and improved holding fixture particularly suited for the support of all or part of a garden or water hose.

PRIOR ART

It is known to provide hose caddies on which garden or water hoses can be coiled and stored. However, such hose caddies are large and relatively expensive.

U.S. Pat. No. 3,119,587 also describes a hose holding fixture which removably supports the end of the hose not connected to a faucet. Such fixture is relatively complex, being assembled of a number of separate elements. Consequently, its manufacturing costs are relatively high.

U.S. Pat. No. 3,667,712 also describes a nozzle storage fixture which is mounted on a hose intermediate its ends and which provides a threaded projection for holding and storing a typical hose nozzle. The above-mentioned letters patent are incorporated herein by reference to illustrate two two different prior art hose fixtures.

SUMMARY OF THE INVENTION

The present invention provides a simple and versatile hose holding fixture which can be produced economically and is easily used. Several embodiments of this invention are illustrated herein.

All of the illustrated embodiments provide a hose holding fixture that is connected to a hose while the hose remains connected to a faucet. The fixtures are easily mounted on the hose and provide a releasable support for all or part of the hose.

In some illustrated embodiments, the hose holding fixture is mounted on the hose and provides a support for the free end of the hose not connected to the faucet or for a conventional hose nozzle. In such embodiments, the fixture is normally mounted on the hose adjacent to the end connected to the faucet.

Although the water hose remains attached to the faucet, the faucet can still be used as a faucet merely by turning on the water just as if there had been no connected hose. This makes it possible for the user to leave the water hose connected to the faucet after use thereof. With such fixtures, the user does not have to stoop or bend to pick up a free or nozzle end of the hose. Such fixtures eliminate any search for the end of the water hose. Without the fixture, the end of the hose is normally in a tangle of hose and is often not easy to locate.

Further, the user does not have to reach into places where vision is limited by plants or shrubs or to search for the hose end when vision is limited at night.

With this fixture, the female connector which connects with the faucet and the free end or male connector are both supported and do not rest on the ground where sand or dirt can collect in the threads or inside the hose. Since the ends of the hose are maintained free of contaminants, it is easier to connect the hose ends to the various accessories and dirt or other contaminants do not enter into the sprinkler outlet holes and cause plugging.

In some illustrated embodiments, provisions are made for supporting and holding other accessories, such as nozzles, sprinklers, or other devices. Since the fixture is mounted on the hose per se, and not on the faucet, the water hose can be moved from one faucet to another without removing the fixture. Further, the fixture can be easily moved along the length of the hose when another location may be more convenient. In instances in which the user does not remove the nozzle from the hose, the fixture can support the nozzle end of the hose along with the attached nozzle.

In other embodiments, a hose holding fixture is provided which releasably supports an entire coiled hose. Such embodiments are connected at one end to the hose adjacent to the faucet, and provide an elongated strap-like extension having a hook at its free end. In use, the hose is coiled, the strap is postioned through the coil, and the hooked end is hooked onto the faucet. With such embodiments, the entire hose is neatly and easily stored in place at the faucet and is ready for use without reconnecting the hose to the faucet.

The various embodiments of this invention provide a generally planar body which may be formed of molded plastic or other materials such as metal and nonplastic, nonmetal materials. In some embodiments, the body provides spaced mounting portions which at least encircle a portion of the hose at two spaced locations along the length of the hose. At least one mounting portion is provided with a hook shape, so that the fixture can be easily mounted on the hose at locations spaced from the end of the hose.

Most illustrated embodiments provide laterally extending support portions which releasably connect and support the free end of the hose and/or a hose accessory, such as a hose nozzle or sprinkler.

Preferably, each embodiment is a one-piece molded fixture formed of strong plastic material which is somewhat flexible. However, it is within the broader scope of this invention to provide fixtures formed of metal or other nonmetals or fixtures which can be fabricated from separate but connected parts.

These and other aspects of this invention are illustrated in the accompanying drawings, and are more fully described in the following specification.

BRIEF DESCRIPTION OF THE DRAWINGS

FIG. 1 is a front elevation of a hose holding fixture in accordance with the first embodiment of this invention, installed on a hose connected to a faucet and supporting the free end of the hose;

FIG. 2 is a side elevation of the fixture of FIG. 1;

FIG. 6a is a front view of a third embodiment of this invention in which two support portions are provided, one for supporting the free end of the hose and the other for supporting a hose accessory;

FIG. 6b is a back view of the embodiment of FIG. 6a;

FIG. 7 illustrates still another embodiment in which two supports are provided on the front face of the mounting portion, one for supporting the hose end and the other for supporting a separate hose accessory;

FIG. 8 illustrates still another embodiment which can be used to support a coiled hose as well as the free end of the hose;

FIG. 8a is a fragmentary view taken along line 8a—8a of FIG. 8;

FIG. 10 illustrates still another embodiment which is used to support a coiled hose.

DETAILED DESCRIPTION OF THE DRAWINGS

Figure 5:
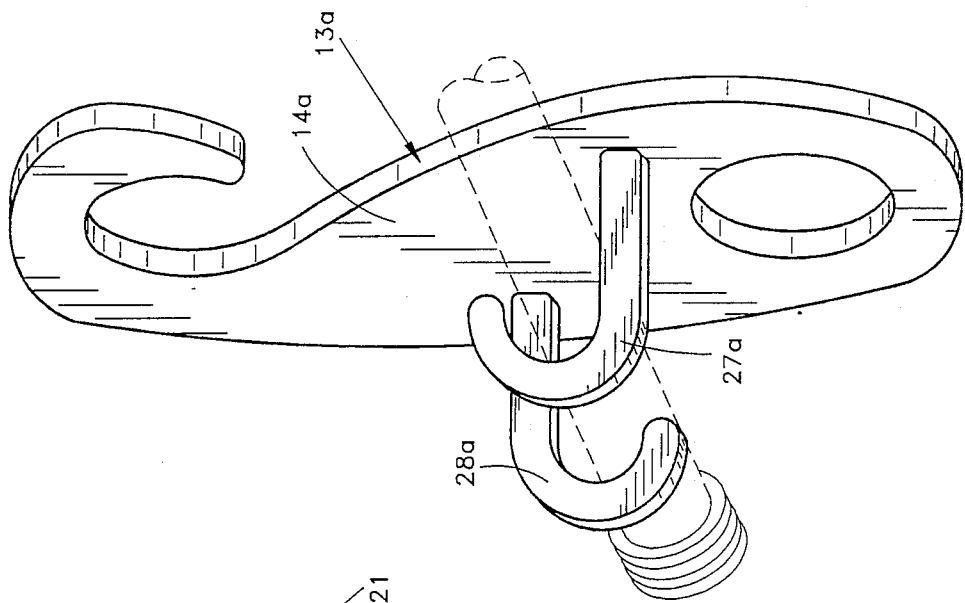
FIG. 5 illustrates a second embodiment of this invention having a body or mounting portion similar to the embodiment of FIGS. 1 through 4 and providing a modified support structure for the free end of the hose.

FIGS. 1 through 4 illustrate a first embodiment of a hose holding fixture in accordance with the present invention. This embodiment is particularly adapted to support the free end of a water or garden hose which remains attached to a faucet.

Referring to the drawings, the female end 10 of a water hose 11 is attached to a faucet or still cock 12 typically provided on the exterior of a building. A hose supporting fixture 13 is mounted on the hose, normally adjacent to the female end 10. However, the fixture can, if desired, be mounted in any location along the length of the hose. The fixture 13 includes a mounting portion 14 which is normally formed of uniform thickness and a laterally extending support loop 16 cooperating with the mounting portion 14 to define an opening 17.

The mounting portion 14 provides hose connecting portions at each end which connect with the hose at spaced locations. One connecting portion 18 is provided with an opening 19 and the other connecting portion 21 is in the form of a hook extending to a free end 22 spaced from the adjacent edge 23 of the mounting portion 14 by a distance at least substantially equal to the diameter of the hose 11. The hook-shaped connecting portion 21, except for the open zone between the end 22 and the adjacent edge 23, cooperates to define an opening 24 sized to receive the hose 11 with clearance.

Figure 4:
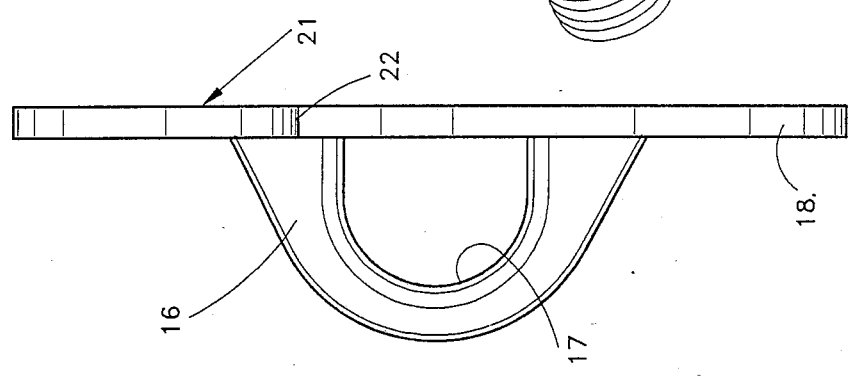
FIG. 4 is an enlarged side elevation of the fixture illustrated in FIGS. 1 through 3, taken along line 4—4 of FIG. 3.
Figure 3:
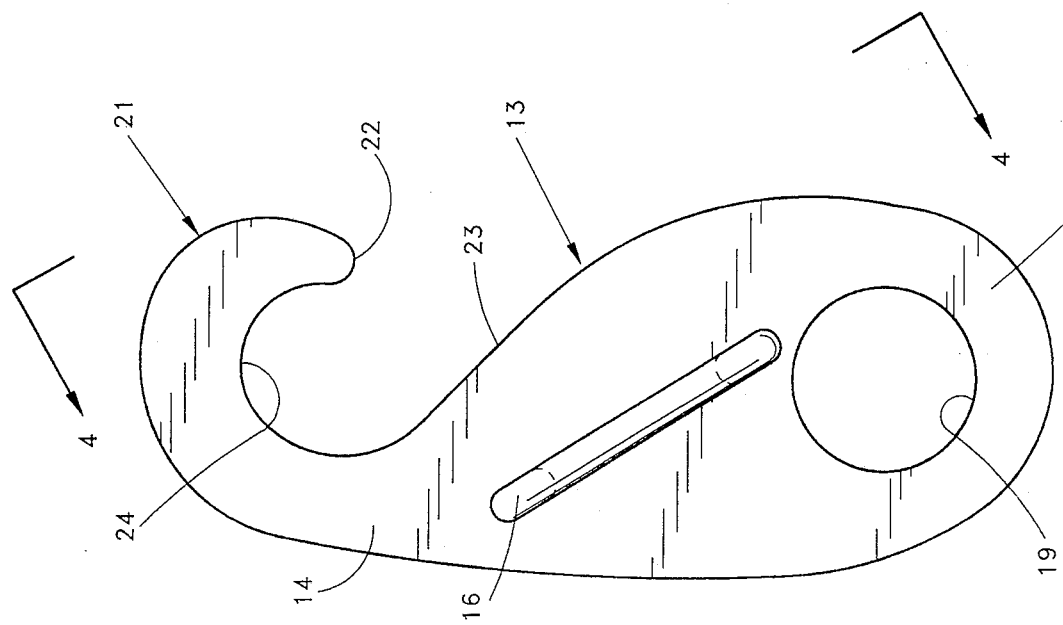
FIG. 3 is an enlarged front elevation of the fixture illustrated in FIGS. 1 and 2 prior to installation on a hose.

As best illustrated in FIGS. 3 and 4, the mounting portion 14 is generally planar and flat in its unstressed condition. However, the mounting portion of the fixture is formed of a material which is sufficiently flexible to allow it to assume the position best illustrated in FIG. 2 when installed on the hose 11. The installation is accomplished by passing one or the other of the ends of the hose through the opening 19. Normally, if the fixture is to be mounted on the hose substantially adjacent to the female end 10 of the hose 11, such end is inserted through the opening 19 from the side of the mounting portion providing the support loop 16. The fixture is then positioned along the length of the hose where it is desired to mount the fixture, and the hose is bent forward and positioned within the hook-shaped connecting portion, as illustrated in FIGS. 1 and 2. The mounting portion should be sufficiently stiff so that the hose between the two connecting portions 18 and 21 is bent or deflected from a straight condition, as best illustrated in FIG. 2. In such position, the hook-shaped connecting portion 21 is also deflected substantially from its unstressed position so that excessive bending of the hose does not occur.

By arranging the fixture so that the hose is bent to some extent between the connecting portions 18 and 21 and so that the hook-shaped connecting portion 21 is deflected substantially from its unstressed condition, a structure is provided which secures the fixture in its mounted position and the fixture does not tend to move along the length of the hose. If it is desired to change the position of the fixture, it is merely necessary to release the hook-shaped connecting portion 21 and move the fixture to any other desired location along the length of the hose and, once properly located, to reconnect the hook-shaped connecting portion as illustrated. The opening 19 is sized to freely pass the female end connector 10 so that such end can be freely passed through the opening 19.

After the fixture is installed, the free or male end 26 can be inserted through the opening 17 provided by the support loop 16, as best illustrated in FIG. 1. Preferably, the support loop is angulated with respect to the portion of the hose on which the mounting portion is installed and is sized to receive the male end of the hose with substantial clearance. Therefore, the end can be easily passed through the opening 17. During insertion and/or removal of the male end of the hose through the opening 17, the male end is normally positioned substantially perpendicular to the support loop, as illustrated in phantom in FIG. 1. However, when it is released, it assumes a substantially horizontal position perpendicular to the portion of the hose on which the mounting portion 14 is mounted.

Preferably, the fixture is molded as a one-piece element with the shape illustrated, and is formed of a plastic moldable material such as various polymers and copolymers to minimize the cost of the manufacture. For example, the fixture may be molded from olefin polymers such as polyethylene or polypropylene, or from vinyl polymers such as vinyl acetate or vinyl chloride. Such material is noncorrosive, and therefore unaffected by exposure to dampness and the like. It is, however, within the broader aspects of this invention to form the fixture 13 of other materials and to even assemble the fixture from a separate mounting portion 14 and support loop 16, which are connected with suitable fasteners or adhesive.

In use, the fixture supports the free end of the hose in a convenient position, permitting the hose to be used as a faucet without being disconnected from the faucet 12. For example, the hose can be used to fill pails, sprinkling cans, and the like while the free end is supported in a convenient location adjacent to the faucet. Further, the free end is held up off the ground and does not become contaminated with dirt, sand, or other debris, and can be conveniently reached even in confined locations. Therefore, the user does not have to look for the end of the hose on the ground. Preferably, the size of the opening 17 is selected so that, if desired, a nozzle attached to the male end 26 of the hose can also be inserted through the opening 17 and supported without removing the nozzle from the free end of the hose.

With this embodiment of the invention, a very simple, low-cost, durable fixture is provided which can be mounted anywhere along the length of the hose, and which provides a support for the free end of the hose.

FIG. 5 illustrates a second embodiment of this invention which provides a mounting portion 14a substantially identical to the mounting portion 14 of the first embodiment of FIGS. 1 through 4. Reference numerals referring to this embodiment include an (a). In this second embodiment, the support loop 16 is replaced by a pair of oppositely facing, spaced hook-shaped projections 27a and 28a. The fixture 13a of this embodiment is mounted on a hose in exactly the same manner as the fixture 13 of the first embodiment. When it is desired to support the free end of the hose, it is merely necessary to angle such free end so that it passes between the two hook-shaped support portions 27a and 28a, and then allow the hose to rotate relative to the hook-shaped support portions 27a and 28a until it assumes the position illustrated in phantom in FIG. 5, in which the hose end is firmly supported and held in position. One of the features of this embodiment is that it is not necessary to pass the male end of the hose through a closed opening and the fixture can be conveniently used to support the end of a hose even when a bulky sprinkler remains attached to the free end of the hose.

FIGS. 6a and 6b illustrate a third embodiment of this invention. In this embodiment, the mounting portion 14b of the fixture 13b is identical to the embodiment of FIGS. 1 through 4 and is mounted in the same manner. Here again, the mounting portion provides a connecting portion 18b having an opening 19b therein sized to permit the insertion of the end of the hose. The mounting portion 21b is formed as a hook which is installed and removed on the hose in the same manner as the first embodiment. Further, the embodiment of FIGS. 6a and 6b provides the support loop 16b similar to the support loop 16 of the first embodiment. Such support loop extends from the front face of the mounting body and may be used to support the free end of the hose in the same manner discussed above. In this embodiment, however, a second support loop 31b is provided on the back side of the mounting portion 14b, as best illustrated in FIG. 6b, and may be used to support a nozzle or other hose accessory.

When installed on a hose, the hose extends along the back side of the mounting portion 14b from the opening 19b to the connecting portion 21b. Therefore, the support loop 31b extends from the rearward face of the mounting portion at an offset location so that it does not provide any significant interference with the hose portion on which the fixture is mounted and which extends along the back side of the fixture between the opening 19b and the hook-shaped connecting portion 21b. The support loop 31b may be used to receive and support a nozzle and the like which is not mounted on the male end of the hose. Here again, the fixture 13b is preferably molded from plastic similar to the plastic of the first embodiment. However, within the broader aspects of this invention, the fixture 13b may be assembled from separate components secured together in a suitable manner.

FIG. 7 illustrates a fourth embodiment of this invention. Here again, the fixture 13c of the fourth embodiment is provided with a mounting portion 14c having an opening 19c at one end and a hook-shaped connecting portion 21c at the other end. In this embodiment, however, the mounting portion 14c is somewhat longer than in the prior embodiments discussed, and the fixture provides two vertically spaced support loops 16c and 32c. In this embodiment, the male end of the hose can be inserted through either one of the support loops 16c or 32c, and the other support loop can be used to support any suitable hose accessory which the user wishes to store on the fixture.

In this embodiment, both of the support loops are on the front face of the mounting portion 14c so that the hose on which the fixture is mounted and which extends along the rearward face of the mounting portion between the two ends thereof does not interfere with the support loops. Again, the fixture 13c can be molded as a unitary element from a plastic or other suitable material, or can be assembled from suitably interconnected elements.

It should be understood that it is within the broader aspects of this invention to provide any of these embodiments with two hook-shaped connecting portions which connect with and grip the hose at spaced locations. For example, the connecting portion 18 can be in the form of a hook-shaped connecting portion similar to the connecting portion 21. In such instance, the fixture need not be initially installed by passing over one of the ends of the hose, but can be directly mounted at any location along the length of the hose.

Figure 9:
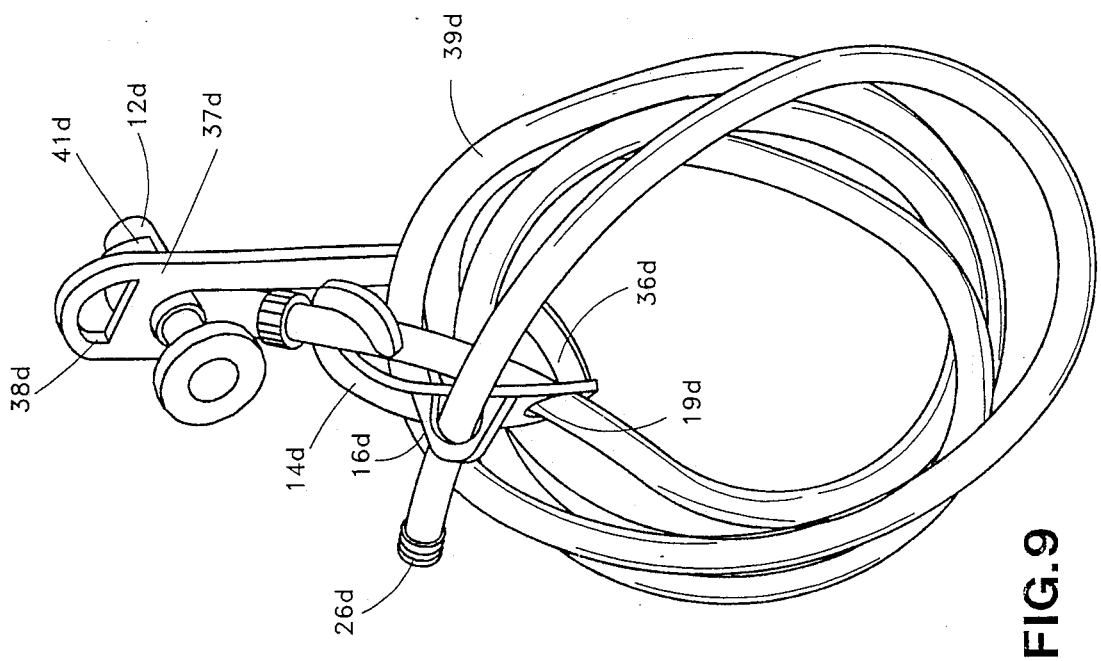
FIG. 9 illustrates the embodiment of FIGS. 8 and 8a in its installed condition in which it supports a coiled hose.

FIGS. 8 and 9 illustrate still another embodiment of this invention. In this embodiment, the fixture can be used to support the entire hose as a coil and also separately support the free end of the hose, as best illustrated in FIG. 9. In this embodiment, one end of the fixture 13d is provided with a mounting portion 14d similar to the first embodiment of FIGS. 1 through 4. Here again, one connecting portion 18d is provided with an opening 19d through which the hose extends, and the other connecting portion 21d is in the form of a hook. Mounted between the two connecting portions is a support loop 16d similar to the corresponding loop in the first embodiment.

In this fifth embodiment, however, the fixture is provided with an elongated strap extension 36d extending from the connecting portion 18d to a hook-shaped end 37d. Such hook-shaped end 37d is provided with a gripping or finger opening 38d which permits the user to easily grip the end 37d.

In use, the mounting portion 14d is secured to the hose in the same manner as in the first embodiment, as best illustrated in FIG. 9. Further, the male end 26d can be inserted through the support loop 16d in a manner similar to the first embodiment. However, in this embodiment, the hose can be coiled, as illustrated at 39d, and positioned behind the portion of the hose on which the fixture is mounted. The strap extension 36d is then passed through the coil and the hooked end 37d is hooked over the faucet 12d to support the entire coil 39d, as well as separately supporting the male end of the hose.

Preferably, the hooked end 37d is provided with a short, arcuate flange 41d in the front face thereof adjacent to the hook. Such flange automatically functions to space the hooked end 37d out away from any flange provided on the faucet or from the building, as the case may be, to space the gripping opening out where it can be easily grasped. Such flange is best illustrated in FIG. 8a.

With this embodiment, the entire coil can be supported at the faucet and is held in a neat manner adjacent to the faucet. Further, with this embodiment, the free end of the hose is supported in a generally horizontal direction, allowing the hose to be used without being disconnected by merely opening the faucet for flow.

Figure 11:
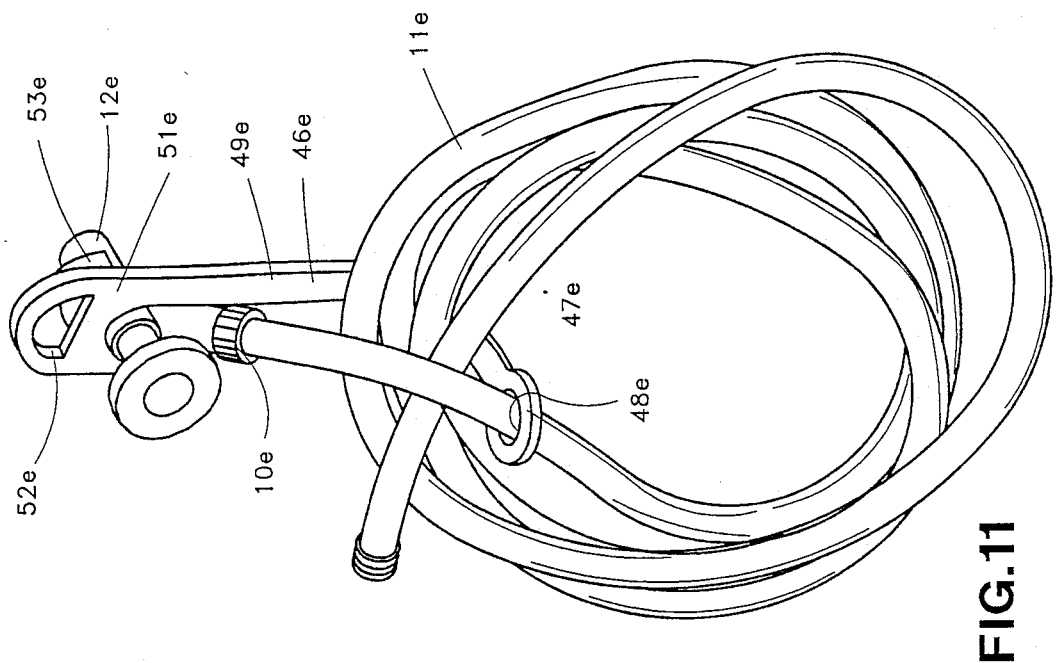
FIG. 11 illustrates the embodiment of FIG. 10 installed and supporting a coiled hose.

FIGS. 10 and 11 show still another embodiment of this invention which functions to support a coiled hose adjacent to the faucet. In this embodiment, the fixture 46e provides a ring portion 47e at one end which defines a closed opening 48e sized to fit over either end of the hose 11e, as illustrated in FIG. 11. From the ring portion, the fixture provides an elongated strap portion 49e extending to a hooked end 51e. Here again, a gripping opening 52e is provided at the end of the hooked portion to facilitate gripping of such end by the user. Also, an arcuate lateral flange 53e is provided to space the hook from the wall or adjacent flange portion on the faucet to facilitate easy gripping of the opening 52e.

In normal use, the female end 10e of the hose is passed through the opening 48e before the female end 10e is fastened to the faucet 12e. When it is desired to store the hose, the hose 11e is coiled and the hooked end is passed through the coil and hooked onto the faucet 12e to support the coil from the faucet.

Preferably, this embodiment, like the other embodiments, is formed as a unitary element of molded plastic. However, it is within the broader scope of this invention to provide a metal ring or the like as a separate element mounted on the end of the strap portion 49e to replace the ring portion 47e.

In all of these embodiments of this invention, a simple, easily manufactured fixture is provided which facilitates the storage of a hose which remains connected to a faucet. The fixtures can be manufactured at low cost and can be distributed in simple, relatively small packages. Further, each of the fixtures can be easily installed and used to maintain an orderly and neat hose arrangement.

Although the preferred embodiments of this invention have been shown and described, it should be understood that various modifications and rearrangements of the parts may be resorted to without departing from the scope of the invention as disclosed and claimed herein.

What is claimed is:

1. A combination comprising a faucet, a hose having two ends with one end connected to said faucet, a hose holding fixture comprising a flat planar element in its unstressed state and providing a mounting portion having spaced connecting portions within the plane of said element both of which at least partially enclose said hose and mount said fixture on said hose, at least one of said connecting portions having a hook shape releasably connected on said hose intermediate its ends, said connecting portions operating to deflect said hose between said connecting portions holding said fixture against movement relative to said hose, said fixture providing a support portion extending laterally from said plane releasably supporting the other of said ends of said hose.

2. A combination as set forth in claim 1, wherein said fixture is formed of a flexible material deflected from its unstressed shape by said hose, the deflection of said hose and fixture causing said fixture to grip said hose locking said fixture on said hose against movement relative thereto.

3. A combination as set forth in claim 2, wherein said flexible material is molded plastic.

4. A combination as set forth in claim 1, wherein the other of said connecting portions provides an enclosed opening through which said hose extends, said fixture being mounted on said hose by passing an end of said hose through said opening and subsequently positioning said hose in said hook-shaped connecting portion.

5. A combination as set forth in claim 4, wherein said support portion provides an opening sized to permit insertion of said other end of said hose to releasably support said other end of said hose.

6. A combination as set forth in claim 5, wherein said support portion is inclined with respect to said connecting portions and supports said other end of said hose substantially perpendicular to the portion of said hose on which said fixture is mounted.

7. A combination as set forth in claim 5, wherein said support portion includes two spaced oppositely facing hook-shaped projections releasably supporting said other end of said hose without requiring insertion of said other end of said hose through said support portion.

8. A combination as set forth in claim 1, wherein said support portion provides an opening permitting insertion of said other end of said hose to releasably support said other end of said hose in a position substantially perpendicular to the portion of said hose on which said fixture is mounted.

9. A combination as set forth in claim 1, wherein said support portion includes two spaced oppositely facing hook-shaped projections releasably supporting said other end of said hose without requiring insertion of said other end of said hose through said support portion.

10. A combination as set forth in claim 1, wherein said fixture provides two support portions extending laterally from said mounting portion, one of said support portions releasably supporting said other end of said hose, the other of said support portions releasably supporting hose accessory.

11. A combination as set forth in claim 10, wherein said mounting portion has front and back faces, and one of said support portions extends from each of said faces.

12. A combination as set forth in claim 10, wherein said mounting portion has front and back faces and both of said support portions project from the same face.

13. A combination as set forth in claim 1, wherein said fixture provides an elongated portion extending from said mounting portion, said elongated portion extending through a coil of said hose and being connected with said faucet to support said coil from said faucet.

14. A combination as set forth in claim 13, wherein said elongated portion provides a hook at the end thereof remote from said mounting portion releasably connected to said faucet.

* * * * *